July 9, 1968 H. TIJMS 3,391,823
RIGIDIFIED POLYETHENE STRUCTURES AND METHOD
OF PRODUCING THEM
Filed March 2, 1965 2 Sheets-Sheet 1
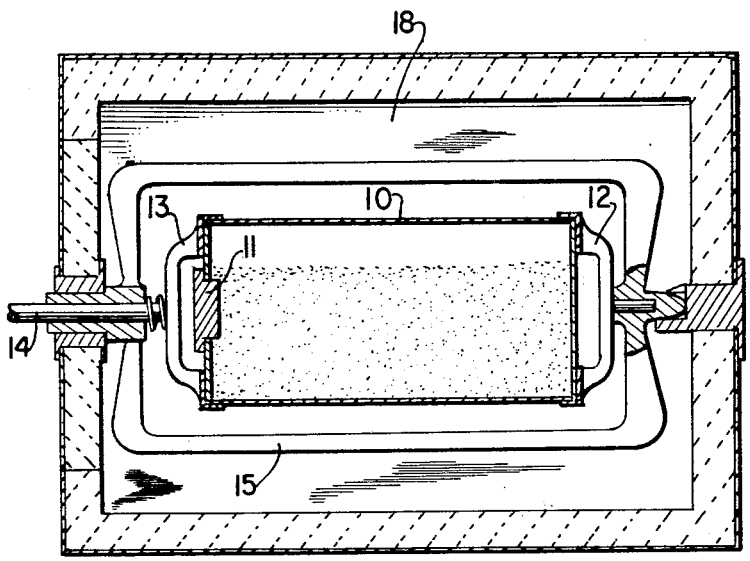
FIG.1
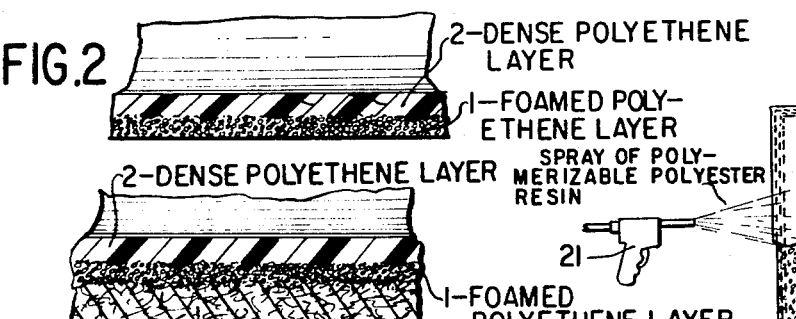
FIG.2
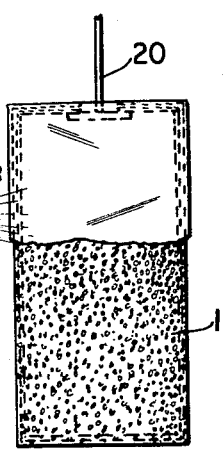
FIG.3
FIG.5
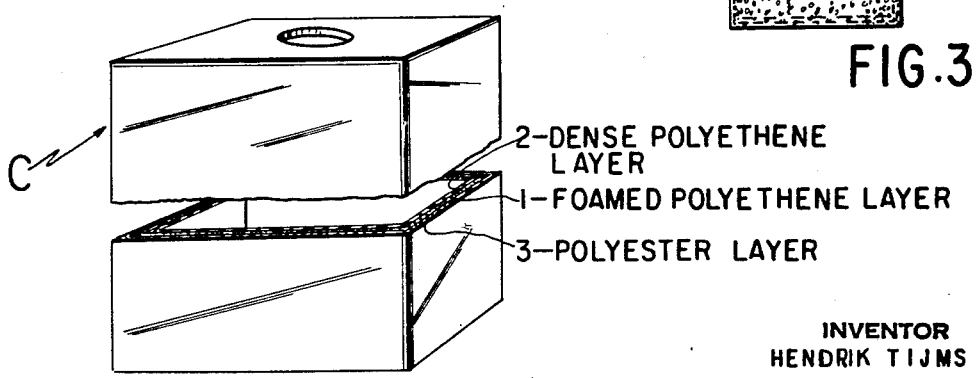
FIG.4
INVENTOR
HENDRIK TIJMS
BY
ATTORNEY

United States Patent Office 3,391,823
Patented July 9, 1968

3,391,823
RIGIDIFIED POLYETHENE STRUCTURES AND
METHOD OF PRODUCING THEM
Hendrik Tijms, Deventer, Netherlands, assignor to Vasco
Industries Corporation, New York, N.Y., a corporation
of New York
Filed Mar. 2, 1965, Ser. No. 436,549
15 Claims. (Cl. 220—83)

This invention relates to molded polyethene structures having valuable combinations of physical and chemical properties, and which can be produced economically in the configurations required to constitute the wall structures of containers, boats, wash basins, panels, and various other desired articles. The invention relates also to a method of producing such structures.

Polyethene is well known to be a synthetic thermoplastic material having excellent properties of chemical inertness and water resistance but possessing a very low modulus of elasticity (Young's modulus), or low rigidity.

The chemical inertness of polyethene, which is attributable to its highly non-polar quality, makes layers of this material excellently suited for use as the wall structure or lining of containers and other articles to be employed in contact with substances that attack other plastics or metals or both.

On the other hand, the low modulus of polyethene severely limits the rigidity and thus the size, economy or serviceability of containers and other articles made of the material. As the size of such containers is increased it becomes necessary either to make them with very thick walls or to support them in rigid frames which themselves are not sufficiently resistant to attack by chemicals. In either case the complexities and costs involved cause otherwise desirable articles that might be made of the material to be commercially unattractive.

It is also well known that polyester resins possess a relatively high modulus of elasticity, or rigidity, but have a much lower resistance to chemicals than that of polyethene. Polyester resins in general are macromolecular substances carrying a multiplicity of

groups in the chain. Typical examples are co-polymers of dicarboxylic acid esters of polyvalent alcohols and vinyl monomers. They often are compounded with reinforcing materials, especially glass fiber, but even then they have a lower resistance to chemicals than polyethene. Other materials which may be incorporated in them include vegatable fibers such as cotton or shredded fabrics, mineral fibers such as asbestos, and finely divided fillers or pigments.

The relatively low chemical resistance of polyester resin is related to its polarity. Due to its relatively high polarity, coatings or layers of this material have not been adherable directly to layers of polyethene by known coating or molding techniques without resort to costly treatment of the polyethene layer, such, for example, as a flame treatment to oxidize its outer surface. Another possible way of bringing the two materials into a single structure has required the bonding of a layer of jute or asbestos to a molded wall of polyethene followed by the application of a layer of glass fiber reinforced polyester to the jute or asbestos layer; but this, too, involves objectionably complex and costly manufacturing procedures.

According to the present invention, it has been discovered that a strong interfacial cohesion between polyethene and polyester layers can be obtained, notwithstanding the widely different chemical and physical properties of the two materials, by forming a foamed layer of polyethene and applying a coating or layer of a polyester resin to and setting it upon the foamed polyethene layer.

By the use of this discovery, rigidified polyethene structures can be readily produced in the form of containers, boat hulls, wash basins, panels, and various other desired articles, with the wall-like body of each article comprising a layer of a reinforced polyester resin set in direct adhesion to a foamed layer of polyethene. Where properties of the polyester resin are desired on both sides of the article, polyester layers may be formed over both sides of the foamed polyethene layer. More advantageously, a layer of reinforced polyester resin is formed and set in direct adhesion to one side of a foamed layer of polyethene having a relatively dense layer of polyethene formed in direct adhesion to its other side, so that the article obtained will have a sandwich-like laminar wall structure possessing great strength together with the valuable properties of polyethene.

Articles made with such a laminar wall structure can be produced economically in any of a great variety of configurations and sizes. The cohesion between the resin layers is so strong that they do not become separated even when the articles are subjected to severe deflection tests, as by squeezing them in a vise. Although the polyester layer may be cracked or broken in such tests, the polyethene remains strongly joined to it everywhere.

Moreover, it has been discovered that this laminar wall structure, by virtue of its sandwich construction along with its other properties, has even a greater rigidity than the same thickness of the reinforced polyester alone. It, therefore, is extremely well suited for the manufacture of large hollow articles such as boat hulls or bulky containers for chemicals.

The production of articles according to the invention can be carried out by the use of various combinations of molding operations, or of molding and coating operations, suited to the properties of the materials to be formed into the adhering layers. When bulky containers or other large hollow articles are to be produced it is advantageous to make them by sintering a mixture of a finely divided polyethene and a blowing agent in an externally heated thin-walled mold, so as to form against the mold wall a foamed layer of polyethene having generally the configuration of the desired wall structure of the article, and thereafter spraying a liquid glass fiber-polyester resin composition onto the foamed layer so as to form thereover a polyester layer that will set to a hardened state in adhesion to the foamed polyethene.

The mold and other apparatus used to form the foamed layer may also be used to form a dense sintered layer of polyethene in adhesion to one side of the foamed layer, before the application of the polyester resin composition to its other side. For example, a charge of a finely divided polyethene can be sintered in the same mold to form a dense layer therein either immediately before or immediately after the sintering operation by which the foamed layer is formed, so that the structure removed from the mold will be composed of a foamed layer of polyethene united with a dense polyethene layer covering either its outer or its inner side, however it may be desired.

While such a laminar structure of polyethene layers without more lacks the rigidity and serviceability to be attained according to the invention, it acquires these qualities upon the application and setting of a layer of reinforced resin over the exposed side of the foamed layer of polyethene as herein set forth. By molding the polyethene layers to the configuration of a container or other hollow article with the dense layer of polyethene at the inner side thereof and forming the polyester layer over the outer side thereof, a self-supporting container or the like can be obtained which will exhibit the full chemical resistance of polyethene to its contents and yet will have a rigidity and usefulness not attainable at comparable cost in any other way.

The polyester resin composition used according to the invention may be any of those which are commercially available or known from the literature relating to self-hardening polyester coating compositions. It is often advantageous to use a polyester liquid compounded with glass fibers to reinforce the polyester layer formed on the foamed polyethene layer. Various other additions, including other reinforcing materials, hardeners, polymerization accelerators or catalysts, and fillers or pigments of various kinds, may also be employed in the liquid polyester composition, as will be readily understood by persons skilled in the art. Among suitable commercial compositions are the polyester resins used in boat-building or for coating the hulls of boats.

The foamed polyethene layer may be formed by the use of various mixtures of polyethenes and blowing agents in various molding techniques. Methods suitable for producing it by the sinter-molding of powder mixtures, and also for joining it with a dense sintered layer of polyethene, are disclosed more fully in a copending United States patent application, Serial No. 408,489, filed November 3, 1964.

The nature of the invention and preferred ways of practicing it will be further apparent from the following illustrative examples and from the accompanying schematic drawings which relate to some of the examples. In the drawings:

FIGURES 1–5 are schematic illustrations of the practice of the invention according to Example 1;

EXAMPLE 1

Figure 6:
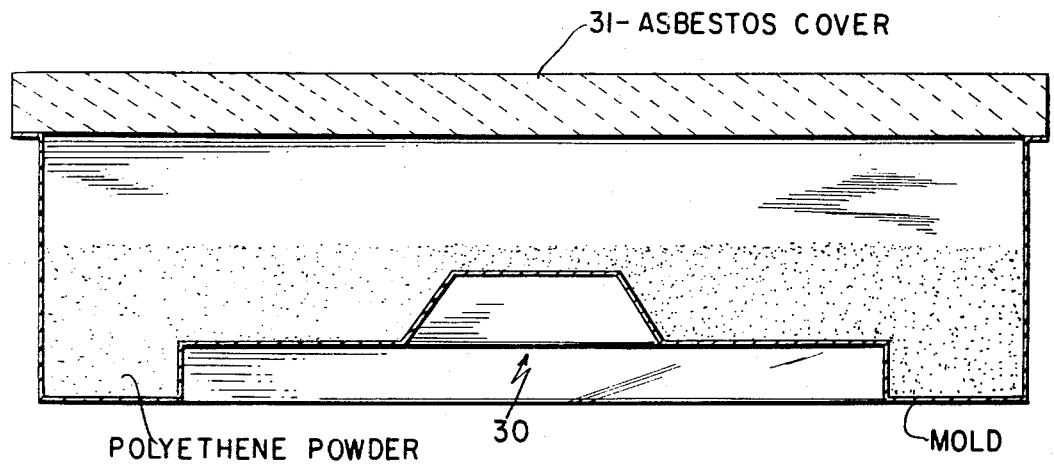
FIGURES 6–7 are schematic illustrations of the mold used and the molded polyethene structure formed in a practice of the invention according to Example 4.

A rectangular sheet metal mold having a length of 100 cm. and a cross section of 50 cm. x 50 cm. was filled to about ¾ of its volume with a mixture of a finely divided polyethene [density 0.918, melting index 2] and 2% by weight of a powdered blowing agent known as Porofor T.R. This is a nitrogen-liberating blowing agent having a density of 1.5, a stated blowing (decomposition) temperature of 115° C., and a theoretical gas generation of 130 ml. per gram.

The mold so filled was heated for 3 minutes in an oven having a temperature of 325° C., while being rotated slowly about its longitudinal axis (at about 2 r.p.m.) to distribute the molding powder continually over the entire inner surface of the mold.

In the course of this heating, a foamed sintered layer of polyethene was formed to a thickness of about 2 mm. upon the heated inner surface of the mold.

Then the mold was removed from the oven and emptied of unsintered powder by removing a heat-insulating closure from one end of the mold and pouring out the surplus of the powder mixture.

The mold was then filled again to about ¾ of its volume with a finely divided polyethene of the nature above noted, without a blowing agent, and returned to the oven for a further heating period of 6 minutes at 325° C.

At the end of that period, the mold was removed from the oven, again emptied of unsintered powder, and then returned to the oven for 4 minutes to smoothen the inner surface of the polyethene structure contained in it. Then it was removed from the oven and cooled, and the molded polyethene structure was removed from the mold.

The structure thus formed was a hollow container having the configuration of the mold and composed of a foamed polyethene layer approximately 2 mm. thick united over its inner side with a dense or non-foamed layer of polyethene approximately 2.5 mm. thick. This structure was so flexible and lacking in rigidity that it would not support itself in upright position.

Then a mixture of 40 parts by weight of glass fiber with 60 parts of a self-polymerizable polyester liquid was sprayed over the outer side of the molded polyethene structure by means of a spray gun, until a polyester layer 5 mm. thick had been formed in adhesion to the foamed layer of polyethene. The polyester used was the type K-572 boat-building resin produced by the firm Synress, Hoek of the Netherlands. The glass fiber was a product of the A.K.U. firm of Arnheim, Netherlands.

After the hardening of the polyester layer, a rigid self-supporting container excellently suited for the storage and transportation of chemicals was obtained.

Referring to FIGURES 1–5 of the drawings, FIG. 1 indicates a sheet metal mold 10 largely filled with finely divided polyethene or with a mixture of finely divided polyethene and a blowing agent as above described. The mold has a heat-insulating closure 11 fitting into an opening in one end wall. It is mounted between clamps 12 and 13 for rotation with a shaft 14 in a frame 15 with which the mold is movable into and out of an oven 18.

FIG. 2 is an enlarged diagrammatic sectional view of a portion of the molded laminar structure removed from the mold. A formed polyethene layer 1 forms the outer side of this structure and is lined by the dense polyethene layer 2 sintered integrally over its inner side.

FIG. 3 indicates a way of supporting the molded polyethene structure on a slowly rotating hanger 20 while a liquid polyester composition is sprayed from a gun 21 over the outer side of the foamed polyethene layer 1.

FIG. 4 is a perspective view, partly broken away, of the laminar container C finally obtained. The wall structure of this container, as seen in the fragmentary sectional view constituting FIG. 5, consists of the foamed polyethene layer 1 integrally joined over its entire inner side with the smooth dense polyethene layer 2, and joined over its entire outer side with a hardened glass fiber reinforced polyester layer 3.

EXAMPLE 2

Practices of the invention substantially according to Example 1 were carried out with variations of the concentration of the blowing agent (Porofor T.R.) in the mixture sintered to form the foamed layer. It was found that when as little as 0.1% of the blowing agent was used the polyester would no longer adhere to the foamed polyethene layer, while when as much as 10% of the blowing agent was used the foamed layer would no longer adhere to the wall of the mold and became deformed.

The most effective of these mixtures were found to be those containing about 1 to 5% of the blowing agent, although other concentrations in the range from 0.25% to 10% gave foamed layers to which the polyester layer would adhere.

EXAMPLE 3

Practices of the invention substantially according to Example 1 were carried out with the use of various grades of finely divided polyethene for the formation of the foamed layer and also for the formation of the dense polyethene layer constituting the inner surface of the container. Among the grades successfully used were polyethenes having melting indices of 1, 7 and 20 and densities of 0.918, 0.940 and 0.960. Those having the lower melting indices are generally to be preferred for the manufacture of containers for use in chemical industries.

EXAMPLE 4

A wash-basin of sheet metal, having generally the internal configuration shown at 30 in FIG. 6 of the drawings, was used as the mold in this example.

The mold was charged with a weighed quantity of powdered polyethene (melting index 7, density 0.918) and was covered by a heat-insulating asbestos plate as indicated at 31 in FIG. 6.

Then the mold was clamped in a mechanism of known character which rotated it about two axes simultaneously so as to distribute the powder continually over its entire inner surface; and while being so rotated it was heated for 12 minutes in an oven at 325° C.

The mold was then removed from the oven, opened, and charged with a weighed quantity of a mixture of powdered polyethene (density 0.918, melting index 2) and 3% by weight of Porofor T.R.; whereupon, it was reclosed and rotated and heated in the oven, as before, for a further period of 10 minutes.

Upon removing the mold from the oven, cooling it and removing its content, a laminar polyethene structure was obtained which, when inverted, had generally the configuration of the original wash-basin, as indicated in FIG. 1 of the drawings. This structure was composed of a centrally depressed top layer 32 of densely sintered polyethene united with an underlying layer 33 of foamed polyethene.

Figure 7:
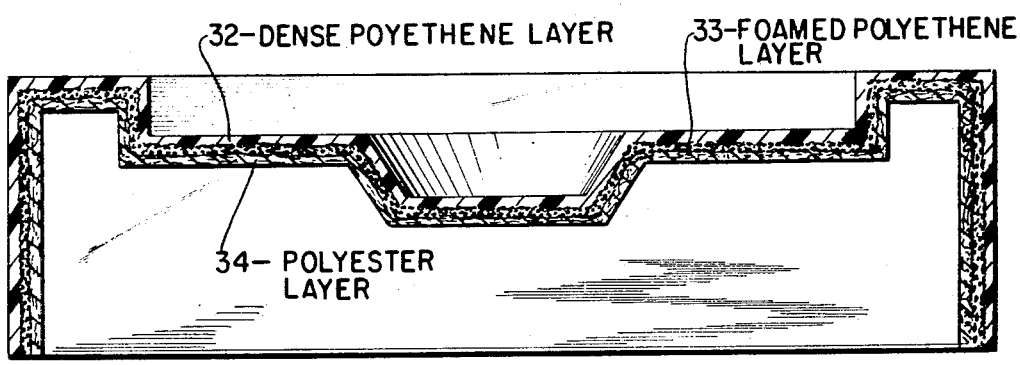

The under side of the foamed layer was then spray-coated with a liquid glass fiber polyester composition of the nature described in Example 1, to form a polyester layer indicated at 34 in FIG. 7. After the hardening of the polyester layer it was finished with a gel coating.

The article so obtained was a very rigid wash-basin having a smooth water-impervious top structure of polyethene. It was capable of being connected to a wall by means of consoles fitted into the recesses A and B (FIG. 7) beneath its side panels. The layer thicknesses as shown in FIG. 7 are greatly exaggerated in relation to the size of the article, the actual thicknesses being, for example, about 2.5 mm. for layer 32, about 3 mm. for layer 33 and about 2.5 mm. for layer 34.

EXAMPLE 5

A sheet metal mold was made in the form of a miniature boat having a length of 60 cm. and a beam of 10 cm.

A mixture of 200 g. of polyethene powder (density 0.950, melting index 3) and 4% by weight of a blowing agent known as Porofor S–44 was placed in the mold, and the mold was closed by an asbestos cover confining the powder to its inner surface. Porofor S–44 has a density of 1.6, a blowing (decomposition) temperature of about 175° C., and a theoretical gas generation of about 120 ml. per gram.

The mold was then rotated about its longitudinal axis while being rocked on a cross axis and heated at 300° C., for 4 minutes.

Then it was opened and 1,000 g. of polyethene powder [density 0.940, melting index] was placed in it; whereupon, it was reclosed, rotated and rocked as before, and heated at 300° C. for 14 minutes.

Then the mold was cooled, the molded polyethene structure was removed from it, and a layer of glass fiber polyester resin was applied to the outside of that structure and set thereon in cohesion with the foamed polyethene layer. After the hardening of the polyester, a gel coating about 0.3 mm. thick was applied to it.

The rigidified molded boat which resulted was extremely strong and durable. Its laminar wall structure consisted of an inner layer of densely sintered polyethene about 2 mm. thick, a middle layer of foamed polyethene about 2 mm. thick, and an outer layer of polyester resin about 2 mm. thick.

According to another important feature of the present invention, it has been found practicable to make containers and other articles formed of the new laminar wall structure which have heating elements such as pipes or heating strips embedded in their wall structure. These articles will serve for heating liquids or other substances held in contact with their wall structure, thus eliminating needs for separate heating elements. A wall structure suitable for this purpose preferably comprises a thin densely sintered layer of polyethene, only about 1 to 2 mm. thick, at its inner side, a foamed polyethene layer approximately 1 mm. thick in cohesion with the outer side of the dense layer, then the heating elements in contact with the foamed layer, and finally the polyester layer which is applied and set over the heating elements and the foamed layer in strong adherence to them.

It is also practicable to embed iron, steel or other metal reinforcing strips in the laminar wall structure in the same manner as the heating elements mentioned above. By making structures according to the invention can be used for the manufacture of very large rigid polyethene containers having, for example, capacities of 1,000 liters or more.

While various details of illustrative embodiments of the invention have been described hereinabove and shown in the accompanying drawings, it will be understood that the invention may be practiced in various other ways and for the production of articles having widely varied compositions, configurations, sizes and arrangements of the resin layers, without departing from the contributions herein set forth and intended to be defined by the appended claims.

The invention claimed is:

1. A rigidified polyethene structure comprising a layer of a polyester resin set in direct adhesion to a foamed layer of polyethene.

2. A rigidified polyethene structure comprising layers respectively of a polyethene and a polyester resin set in direct adhesion to opposite sides of a foamed layer of polyethene.

3. A rigidified polyethene structure comprising a layer of glass fiber reinforced polyester resin set in direct adhesion to a foamed layer of polyethene.

4. A rigidified polyethene structure comprising a layer of a polyester resin sprayed onto and set in direct adhesion to a foamed sintered layer of polyethene.

5. A rigidified polyethene structure comprising a foamed sintered layer of polyethene having a relatively dense sintered layer of polyethene set in direct adhesion to one side thereof and having a layer of glass fiber reinforced polyester resin sprayed onto and set in direct adhesion to the other side thereof.

6. A self-supporting container highly resistant to chemicals, the body-forming wall of which consists essentially of a foamed layer of polyethene having generally the configuration of such container, and having a relatively dense layer of polyethene covering and in direct adhesion to its inner side, and having a relatively rigid layer of a polyester resin covering and in direct adhesion to its outer side.

7. The method of producing a rigidified molded polyethene structure, which comprises forming a foamed layer of polyethene having substantially the configuration of the desired structure and forming a layer of a polyester resin upon and setting the same in adhesion to a side of said foamed polyethene layer.

8. A method according to claim 7, said polyester resin being a glass fiber reinforced polyester resin.

9. A method according to claim 7, said polyester resin layer being formed by spraying a liquid polyester resin onto a side of said foamed polyethene layer.

10. The method of producing a rigidified molded polyethene structure, which comprises forming a dense layer of polyethene having the configuration of the desired article, forming a foamed layer of polyethene upon and setting the same in adhesion to said dense layer, and forming a layer of a polyester resin upon and setting the same in adhesion to the side of said foamed layer disposed away from said dense layer.

11. The method of producing a rigidified molded polyethene structure, which comprises sintering a mixture of a finely divided polyethene and a blowing agent into a foamed layer of polyethene having generally the configuration of the desired structure and spraying a liquid polyester resin into a layer upon and setting the same in adhesion to a side of said foamed layer.

12. A method according to claim 11, said polyester resin being a glass fiber reinforced polyester resin.

13. The method of producing a rigidified molded polyethene structure, which comprises sintering finely divided particles of polyethene into a dense layer thereof having the configuration of the desired structure, sintering a mixture of a finely divided polyethene and a blowing agent into a foamed layer of polyethene lying upon and in adhesion to said dense layer, and thereafter spraying a liquid polyester resin into a layer upon and setting the same in adhesion to the side of said foamed layer disposed away from said dense layer.

14. A method according to claim 13, said polyester resin being a glass fiber reinforced polyester resin.

15. The method of producing a rigidified molded polyethene structure, which comprises sintering a mixture of finely divided particles of polyethene and a blowing agent into a foamed layer of polyethene having generally the configuration of the desired structure, sintering finely divided particles of polyethene into a dense layer thereof covering and in adhesion to one side of said foamed layer, and thereafter spraying a liquid polyester resin into a layer upon and setting the same in adhesion to the other side of said foamed layer.

References Cited

UNITED STATES PATENTS

| 2,736,925 | 3/1956 | Heisler et al. | 264—126 |
| 2,949,181 | 8/1960 | Buccino | 206—63.3 |
| 3,188,265 | 6/1965 | Charbonneau | 161—188 |

FOREIGN PATENTS

| 585,395 | 2/1947 | Great Britain. |

ROBERT F. BURNETT, *Primary Examiner.*

W. J. VAN BALEN, *Assistant Examiner.*